US 6,659,306 B2

(12) United States Patent
Boyle et al.

(10) Patent No.: US 6,659,306 B2
(45) Date of Patent: Dec. 9, 2003

(54) ELECTRONIC LUBE GUN WITH MASTER STATION CONTROL

(75) Inventors: Richard R. Boyle, Milwaukee, WI (US); Ronald D. Benson, Colgate, WI (US); Joseph S. Simon, Jackson, WI (US); Robert J. Fehl, Milwaukee, WI (US)

(73) Assignee: Badger Meter, Inc., Milwaukee, WI (US)

( * ) Notice: Subject to any disclaimer, the term of this patent is extended or adjusted under 35 U.S.C. 154(b) by 132 days.

(21) Appl. No.: 09/969,193

(22) Filed: Oct. 2, 2001

(65) Prior Publication Data

US 2003/0062380 A1 Apr. 3, 2003

(51) Int. Cl.⁷ ................................................. B67D 5/30
(52) U.S. Cl. ............................................. 222/1; 222/14
(58) Field of Search ........................... 222/1, 14, 16, 222/23, 32, 37, 52, 55, 63, 71; 251/129.04; 700/282, 283

(56) References Cited

U.S. PATENT DOCUMENTS

| 4,883,199 | A | | 11/1989 | Ouarve et al. | |
|---|---|---|---|---|---|
| 5,184,309 | A | * | 2/1993 | Simpson et al. | 700/283 |
| 5,249,129 | A | | 9/1993 | Lamoureux et al. | |
| 5,433,342 | A | | 7/1995 | Luro | |
| 5,612,890 | A | | 3/1997 | Strasser | |
| D382,500 | S | | 8/1997 | Johnson et al. | |
| 5,867,403 | A | | 2/1999 | Sasnett, Jr. et al. | |
| 5,941,418 | A | | 8/1999 | Box et al. | |
| 6,357,300 | B1 | * | 3/2002 | Johnson et al. | 73/861 |
| 6,443,328 | B1 | * | 9/2002 | Fehl et al. | 222/14 |
| 6,571,151 | B1 | * | 5/2003 | Leatherman | 700/282 |

FOREIGN PATENT DOCUMENTS

| EP | 0 781 725 B1 | 7/1997 |
|---|---|---|
| EP | 0 787 678 A1 | 8/1997 |

OTHER PUBLICATIONS

Port–Evac, Portable Fluid Evacuation Pump Assembly, 114 Catalog: Vehicle Lubrication Systems, Graco Inc., Minneapolis, MN 1992.

* cited by examiner

Primary Examiner—Gene Mancene
Assistant Examiner—Patrick Buechner
(74) Attorney, Agent, or Firm—Quarles & Brady LLP

(57) ABSTRACT

A system for delivering a preset volume of fluid, such as oil, includes a master control station (1) and one or more metering device (8) communicatively linked through a wireless communications network. The master control station (1) provides command signals to enable dispensing of a fluid from the metering device (8) and provides a preset amount of fluid to be dispensed. The metering device (8) is manually activated by a manually-operated lever (14), and is thereafter latched in an open position to dispense lubricant. The amount of lubricant dispensed is metered until the predetermined amount of lubricant is dispensed. After the preset amount is dispensed, the metering device (8) is latched in a closed position, preventing further dispensing until the metering device (8) is again enabled by the central control station (1).

34 Claims, 6 Drawing Sheets

ELECTRONIC LUBE GUN WITH MASTER STATION CONTROL

TECHNICAL FIELD

The invention relates to metering guns or nozzles for dispensing a lubricating fluid.

BACKGROUND ART

In the field of vehicle service, handheld metering guns or nozzles are used to dispense predetermined amounts of lubricating fluids, such as oil. These devices have a lever that is squeezed against a handle to begin operation. A metering portion of the device then measures the amount of fluid passing through the device and closes a valve when a preset amount of the fluid has been dispensed. Such devices are useful in servicing vehicles using bulk supplies of oil or other lubricants, and are also useful in other industrial applications.

An example of such a device is disclosed in Fehl et al., U.S. patent application Ser. No. 09/595,829 filed Jun. 16, 2000 and now allowed. In this device a programming keypad is integrated with a lube meter for metering the dispensing of oil or other lubricants.

There is, however, a problem associated with allowing such devices to be used in a standalone mode, in that the device could be operated before a meter is started to measure the dispensed lubricants. Thus, oil or other fluids might be dispensed without being accounted for. Furthermore, because each device is programmed and operated by an individual user, it can be difficult to maintain uniform control over the amount of fluid dispensed at a service station or facility.

U.S. Pat. No. 5,941,418 discloses a system in which multiple lubrication meters are controlled by a control pendant. In this system the pendant is used for the purpose of the keypad already integrated in the device of Fehl et al., cited above. Here, the lubrication meters are linked together through a twisted-pair network. The pendant can be coupled to any of the lubricating meters for the purpose of programming the system and ordering the dispensation of fluids.

While this system provides some advantages in monitoring and controlling overall fluid delivery, however, this system also presents a number of disadvantages. For example, the twisted pair network requires a large amount of network infrastructure in the service facility, and limits the ability to move the lubricating meters to suit the size and location of vehicles, containers, or other equipment to be serviced. Furthermore, the system cannot be controlled from a central office or location unless the twisted pair network is wired additionally to the central location.

There is a need in the art to provide a flexible system for automatically controlling dispensing lubricants from one or more handheld metering device, and for ensuring that programmed batches are dispensed and accounted for.

SUMMARY OF THE INVENTION

The invention is incorporated in a method and device for dispensing a lubricating fluid, in which the device is held in a disabled state until an enable signal is received from a master control station, thereby protecting the device from dispensing lubricant that is not metered. After the enable signal is received, a programmed batch is dispensed and, when completed, the operator hits a reset button to signal completion of the first batch and set up for the next enable signal for the next batch.

More specifically, the invention comprises a method of controlling the dispensing of an amount of lubricant by a dispensing apparatus. A valve is blocked until an enable signal is received from a control station. Upon receipt of the enable signal, the valve can be manually actuated from a closed to an open position. After manual actuation, the valve is latched in the open position, and a parameter of the flow of the liquid is measured until the parameter equals a preset amount. An electrically operable device is then activated to unlatch the valve, and the valve is allowed to return to a closed position, wherein the flow of liquid is stopped, and a signal is generated and transmitted to the control station indicating that the batch preset amount has been dispensed. Upon receipt of a signal from the control station, the valve is again blocked from operation until the next enable signal is received.

It is an object of the invention to provide a lubricant dispensing system comprising a central control station and one or more handheld metering devices which communicate through a wireless communications network, and particularly through an RF communications network.

It is another object of the invention to provide a lubricant dispensing system wherein a preset amount of lubricant to be dispensed can be selected at a central control station.

It is yet another object of the invention to provide a lubricant dispensing system including a latch which can lock the dispensing or metering device in both an open and a closed positions.

It is yet another object of the invention to provide a lubricant dispensing system wherein the central control station is capable of providing an override signal, wherein upon receipt of the override signal, the handheld metering device latches the valve in the closed position.

It is still another object of the invention to provide a multi-piece valve assembly, wherein interaction between a start actuator piece positioned between an actuating lever and the valve member and a latching pin prevents leakthough from the valve when the valve is in a locked closed position.

It is another object of the invention to provide some play in the manually-actuated lever to prevent overstressing of the lever. The play provides manual feedback to the user when the lever is disabled from operation indicating that the lever is blocked.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE PREFERRED EMBODIMENTS

Figure 1:
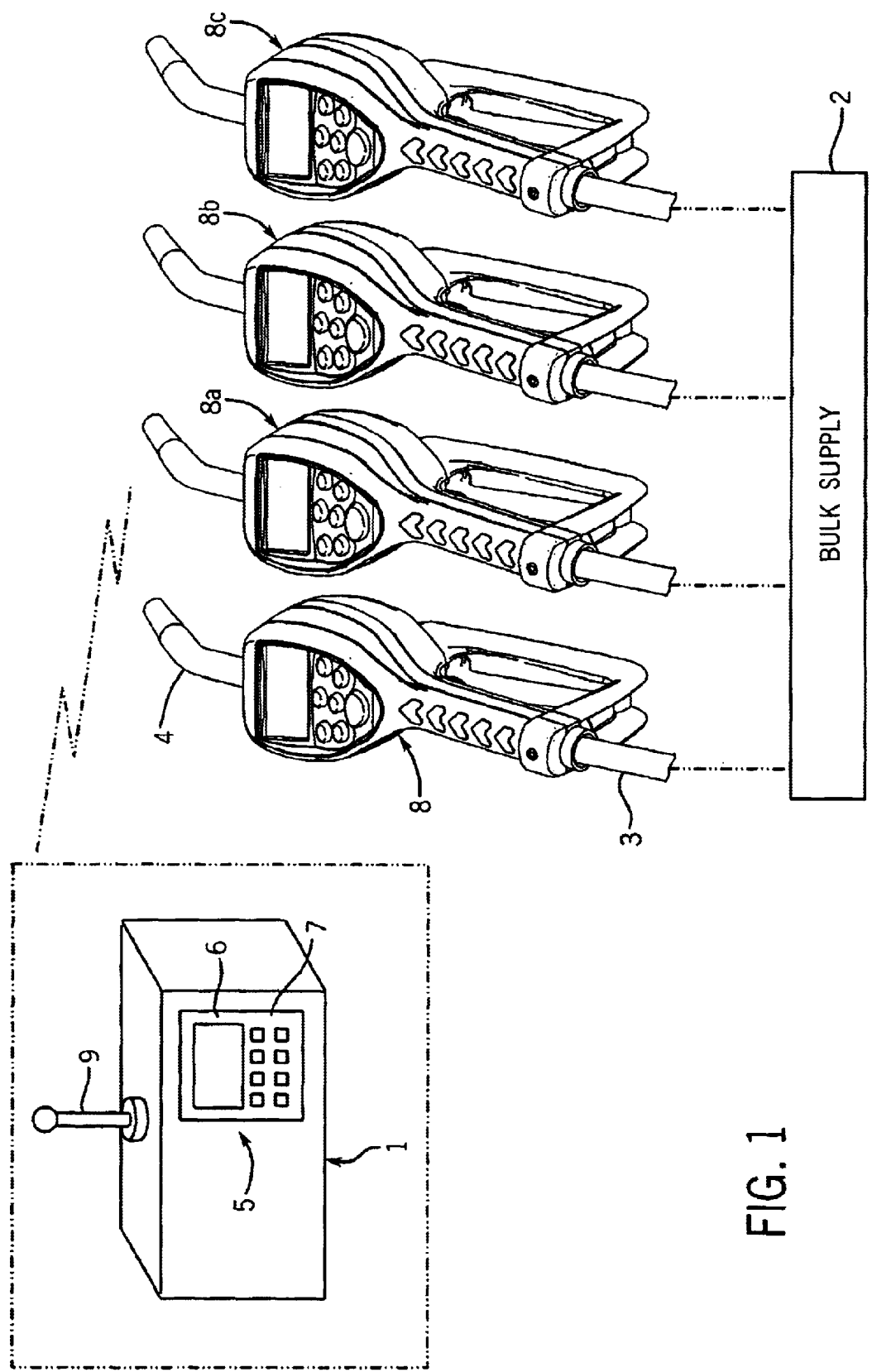
FIG. 1 is a schematic diagram of the RF networked system incorporating the control station and several handheld metering devices.

Referring first to FIG. 1, a dispensing system constructed in accordance with the present invention is shown. The dispensing system comprises a master control station 1 which is communicatively coupled to one or more handheld metering device 8. The metering devices 8 are each coupled to a bulk supply 2 by respective hoses 3. The bulk supply 2 supplies an oil, grease, or other lubricant to the metering device 8, and each metering device 8 selectively supplies the lubricant to a vehicle, tank, or container (not shown) through a spout 4.

The master control station 1 includes a user interface 5 comprising a display 6 and an input device such as a plurality of keys 7. The control station 1 further includes a transmitter and receiver (not shown) and an associated antenna 9, which are communicatively coupled to the metering devices 8 through a communications network, which is preferably a low power wireless radio frequency link. It will be apparent that other wireless and wired communications networks can also be used.

The amount of lubricant to be dispensed from each of the dispensing apparatuses 8 can be entered into a dispensing or batch program in the control station 1 through the user interface 5. The control station 1 communicates program information, including the preset amount of lubricant to be dispensed, to the dispensing units 8 through the network communication link. Alternatively, programs for each metering device 8 can be entered through programming keys 20 connected to the dispensing apparatus 8, as will be described more fully below. In either case, the dispensing program is controlled by a combination of manual inputs provided at the metering device 8 and through commands transmitted from the control station 1. These commands can include, for example, enable dispensing signals, start and stop dispensing signals, interrupt signals, reset signals, and meter start and stop signals. Other status data and commands can be communicated between the control station 1 and metering device 8, as described below.

Figure 2:
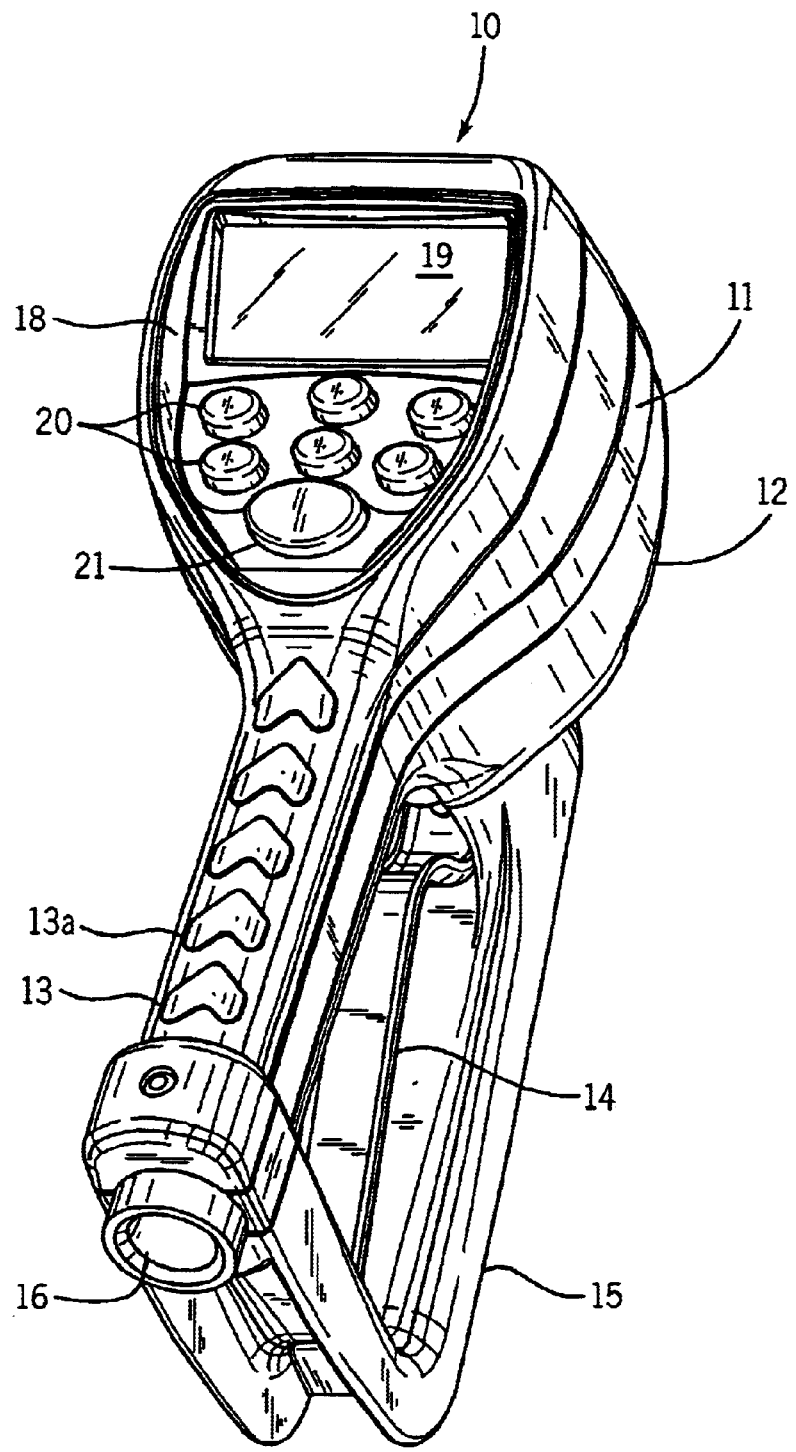
FIG. 2 is a perspective view of a device that incorporates the present invention.
Figure 3:
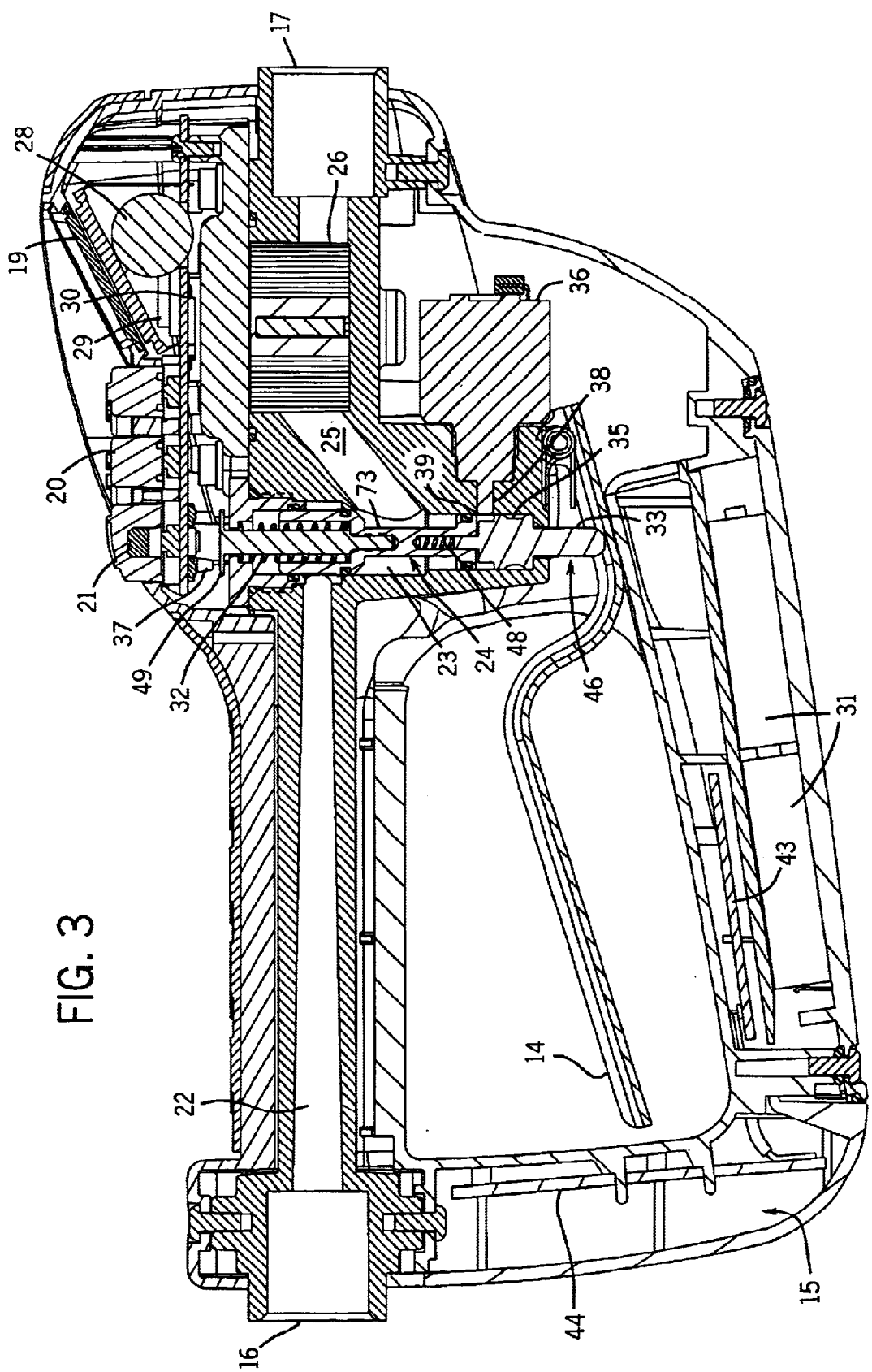
FIG. 3 is a sectional view of the device of FIG. 2.

Referring now to FIG. 2, the metering device 8 of the present invention includes a casing 10, primarily of molded plastic material, except for an exposed metal band, which is an outside edge of a metal band housing 11. The casing 10 includes a head portion 12, a rounded handle 13 extending from the head portion 12, and a trigger guard portion 15 which extends from the head portion 12 and connects to a distal end of the handle 13. The device includes a manual lever 14 which, when squeezed against the handle 13 to further operate a valve (not shown in FIG. 2) opens and closes to control the flow of liquid. The liquid enters through inlet port 16 and exits through outlet port 17 (FIG. 3). Chevron-shaped treads or projections 13a are spaced along the handle 13 to provide for a better grip.

The metering device 8 also includes a bezel portion 18 which fits around a user interface which can comprise a visual display 19 and a group of six programming keys 20 and one manual stop button 21. The manual stop button 21 provides an electrical signal to the control circuit 40 (FIG. 5) to close the valve and shut off liquid flow, in a manner described below.

Referring now to FIG. 3, lubricating liquid flows into inlet port 16 and through supply passage 22 to a valve chamber 23. A valve member assembly 24 is arranged vertically in a valve seat for movement up and down to control liquid flow through the valve chamber 23. On the other side of valve chamber 23, a second, inclined, supply passage 25 connects to a metering chamber in which two eccentric metering gears 26 turn in response to liquid flow. The liquid flows through metering gears 26 and out of the outlet port 17.

The valve member assembly 24 is a multi-piece assmembly preferably comprising three parts, which are hereafter referred to as a start actuator 46, a stop actuator 45, and a valve member 73. Each of these parts will be described more fully below.

The start actuator 46 is moveably coupled inside the valve member 73, and includes a push rod 33, first and second recesses 35 and 39, and a spring 48. The recesses 35 and 39 are sized and dimensioned to receive a latching pin 38 which is selectively activated by the electrical latching solenoid 36 for latching the valve member 73 in either an open or locked closed position as described below. The push rod 33 is disposed to be activated by the lever 14, and the spring 48 provides a return function, as well as manual feedback to an operator activating the lever 14 as described below.

The stop actuator 45 includes a flange 49 and a return spring 32. When the lever 14 is actuated and the valve member assembly 24 moves to an open position, the flange 49 activates a sensing switch 37, thereby providing an indication to the circuit board 27 that the valve member assembly 24 is open and can be latched in the open position, as described below. When the valve member assembly 24 is returned to a manual or locked closed position, the return spring 32 causes the flange 49 to deactivate the sensing switch 37, thereby providing a signal to the circuit board 27 that the valve member assembly 24 is no longer in the open position.

An electronic circuit board 27 is installed under the display 19, programming keys 20, and stop button 21 of the head portion 12 of the casing 10. A large capacitor 28 is mounted on the circuit board 27 along with a microelectronic processor 29, to one or more reed switch 30, to a display 19 and to other components to be described below. A radio board 43 including a receiver and a transmitter circuit for radio frequency (RF) communication with the master control station 1 is located in the trigger guard portion 15, along with an associated antenna 44. Power for the electronic circuit board 27, radio board 43, antenna board 44, and other circuitry is provided by four AA-sized batteries 31, also located within the trigger guard portion 15 of the casing 10. The radio board 43 is further electrically coupled to the electronic circuit board 27, wherein programs, commands and delivery status data can be transmitted to and received from the processor 29 and associated memory components, as described below.

To measure the amount of lubricant dispensed, the processor 29 executes a control program stored in memory to count metering pulses generated by gears 26 and sensed through the reed switches 30 to units of flow and displays the value on display 19. The display 19 is capable of showing flow parameters, including for example, total volume and re-settable total.

The metering gears 26 include permanent magnets (not shown). As the gears 26 and magnets rotate, they cause reed switches 30 to open and close due to the change in polarity of the magnetic field generated by the permanent magnets. The electrical pulses generated by the reed switches 30 are communicated to the processor 29 located on circuit board 27.

In operation, the metering device 8 can be held in three different states, depending on the position of the latching pin 38. These states are: a locked open state, wherein the valve member assembly 24 is latched open by the latching pin 38; a locked closed state, wherein the valve member 24 is "locked out", or held closed by the latching pin 38; and a normally-closed manual state, wherein the latching pin 38 is not engaged and the lever 14 can be manually activated to open the valve and provide lubricant flow from the inlet 16 to the outlet 17. Activation of the electrically operable latching mechanism 36 to extend or retract the latching pin 38 into receiving recess 35 or 39 therefore determines the state of the metering device 8, as described below.

Referring again to FIG. 3, it can be seen that the latching pin 38 is not engaged in either recess 35 or 39 and that therefore metering device 8 is in the manual state. In this state, the valve member assembly 24 is forced closed by the spring 32 until the lever 14 is activated. Here, squeezing the lever 14 towards the handle 13 causes the lever 14 to contact and move the push rod 33 of the start actuator 46, causing valve member 73 to be lifted upward to a position in which valve chamber 23 communicates with supply passage 22. Valve chamber 23 is also in communication with supply passage 25, to complete a flow path for the liquid from inlet 16 to gears 26 and eventually to outlet 17.

Figure 4A:
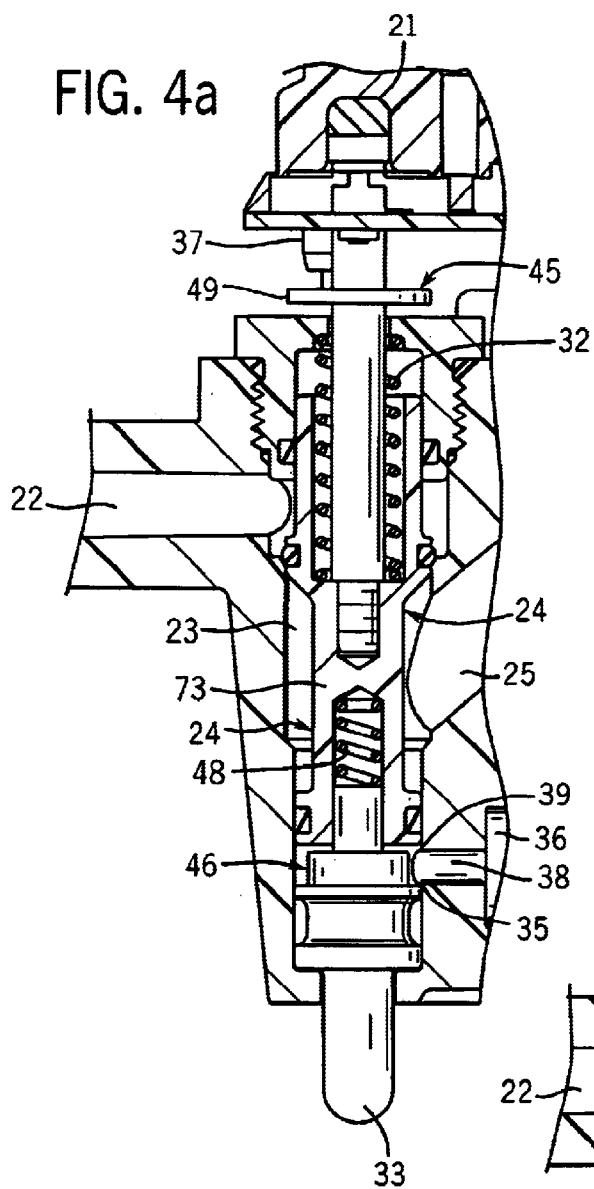
FIGS. 4a and 4b are detail views of the manual actuator and valve spool in the closed position and open position, respectively.

Referring now to FIG. 4a, the metering device 8 is shown in the locked closed state. Here, the latching solenoid 36 is activated to extend the latching pin 38 into the recess 39, preventing movement of the valve member 73 such that the valve 23, 24 is maintained in a closed position, preventing the flow of fluid through the supply passages 22 and 25. The recess 39 is dimensioned to include a small amount of additional space or "play" wherein the start actuator 46 can be moved slightly even when the latching pin 38 is in the recess 39. As the lever 14 is actuated, however, the start actuator 46 contacts the latching pin 38 before the valve member assembly 24 can be opened, thereby preventing any flow of fluid or "leak through" to occur through the valve 24. Furthermore, when the lever 14 is activated with the valve member assembly 24 in the locked closed position, the spring 48 provides a reactive force opposing the activation of the lever 14 which helps to prevent the operator from overstressing the lever, and therefore prevents potential damage to the metering device 8.

Figure 4B:
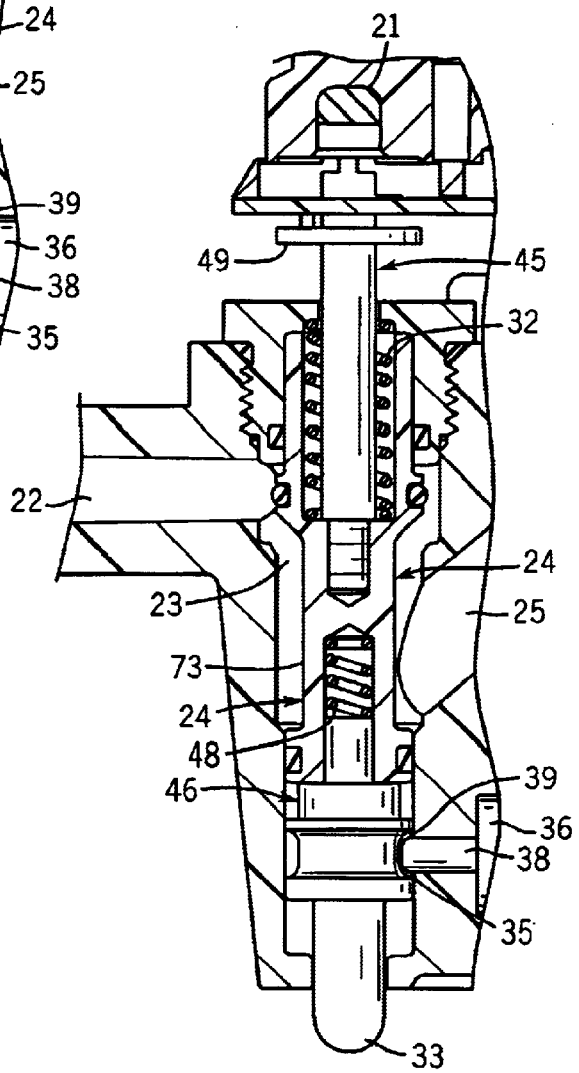

Referring now to FIG. 4b, the metering device 8 is shown in the open position. Here the latching solenoid 36 is activated to extend the latching pin 38 into the latching recess 35. The valve 23, 24 is held in the open position, allowing the flow of fluid through the supply passages 22 and 25. When the valve member assembly 24 is open, the metering gears 26 rotate at a rate proportional to the flow rate of the liquid, and fluid flow can be metered as described above.

Figure 5:
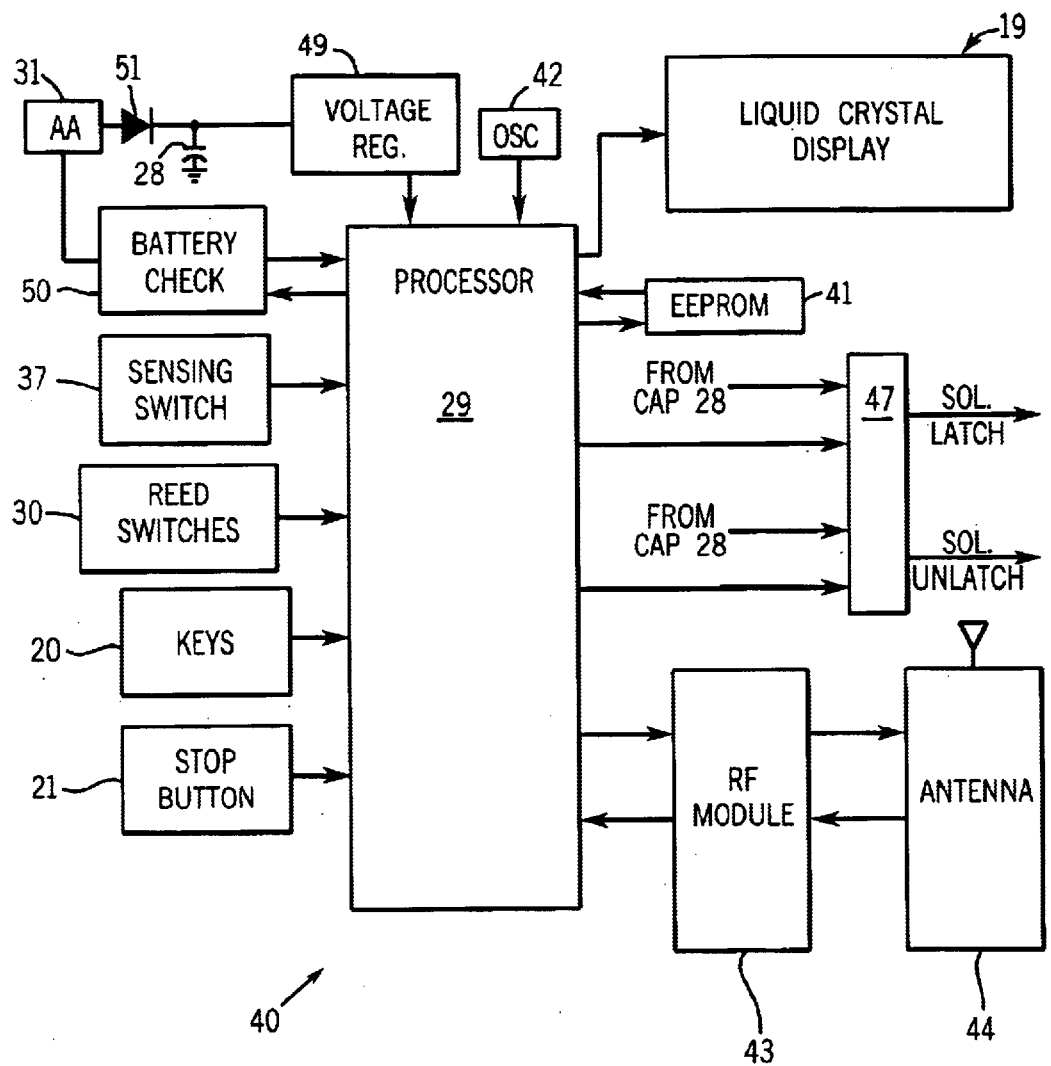
FIG. 5 is a block diagram of the electrical system in the device of FIGS. 2 and 3.

Referring to FIG. 5, an electronic control circuit 40 mounted on circuit board 27 includes processor 29, which in the preferred embodiment, is provided by an MSP 430 microelectronic processor 29 with on-board memory available from Texas Instruments, Inc. A control program of instructions is stored in the on-board memory to carry out the control functions described herein. A EEPROM 41 is also connected to the processor 29 to store user settings and batch histories. A crystal oscillator circuit 42 provides timing signals for driving the processor 29. The processor 29 reads inputs from programming keys 20 and transmits data to display 19. The processor 29 also transmits control signals to enable latching the solenoid 36 (SOL. LATCH) and to enable unlatching the solenoid 36 (SOL. UNLATCH). These are coupled to the solenoid 36 through power transistor circuits 47. The processor 29 also senses input signals from reed switches 30 and trigger sensing switch 27. The processor 29 senses the voltage of the batteries 31 through a battery check circuit 50. The batteries supply six dc volts unregulated power to a voltage regulator circuit 49, which supplies 3.3 dc volts power to the other circuitry in the control circuit 40. The capacitor 28 is connected through a diode 51 to the batteries 31 to be charged by the batteries 31 to six dc volts unregulated power.

The circuit board 27 and associated processor 29 are further coupled to the radio board 43 and associated antenna 44 through a bi-directional link. Through the radio board 43, the processor 29 receives command signals and data from the control station 1, and transmits command signals, status information and data to the control station. In addition, the circuit board 27 and associated processor 29 receive input signals from the programming keys 20 and stop button 21. When the stop button 21 is actuated, the processor 29 provides a signal to the latching solenoid 36 to unlatch the solenoid and close the valve assembly 24. The programming keys 20 can be used to program "batches", or the amount of fluid to be dispensed when the metering device 8 is used in a manual mode, and can also be used to supply a "reset" signal. The reset signal is received by the circuit board 27 and can be transmitted to the control station 1 through the radio board 43.

In operation, the metering device 8 is controlled by the control circuit 40 and the control station 1 to dispense preset amounts or batches of lubricants. The control station 1 provides command data to the control circuit 40 which can include, for example, start commands, stop commands, interrupt commands, and programs providing an amount of a lubricant to be dispensed. The metering device 8 receives commands from the control station 1, and controls the opening and closing of the valve member assembly 24, as well as metering functions, and manual operator signals.

Figure 6:
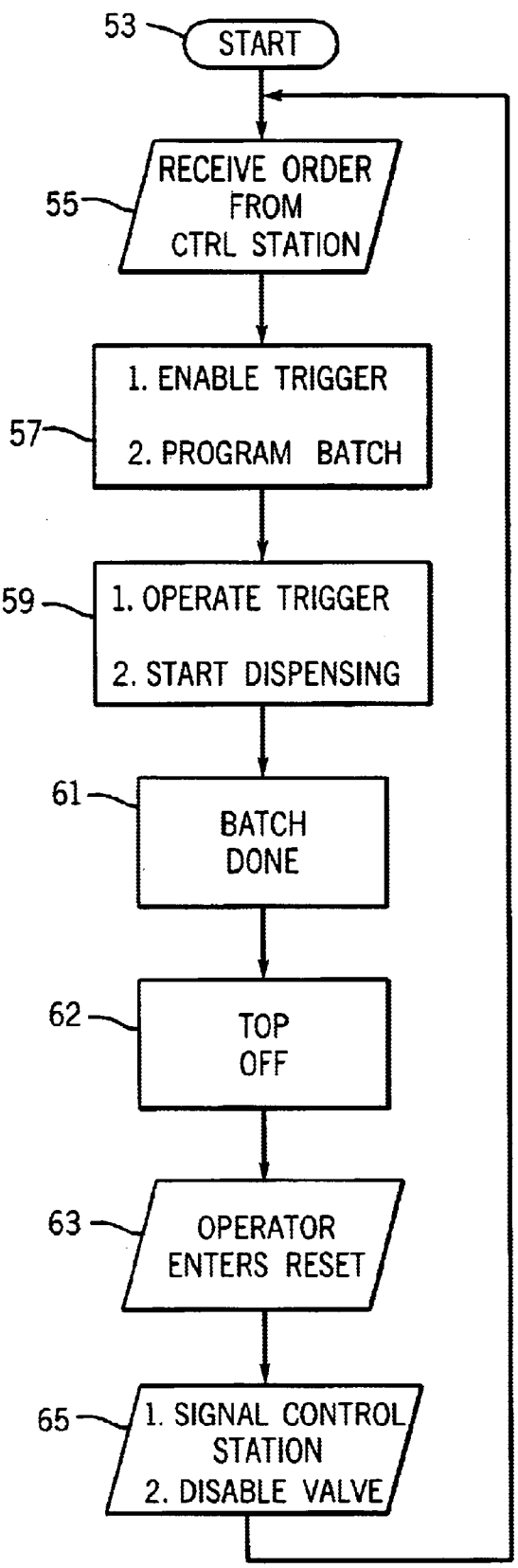
FIG. 6 is a flow chart of the operation of the handheld metering device and control station.

Referring now to FIG. 6, a flow chart illustrating the operation of the metering device 8 in dispensing a lubricant in accordance with present invention is shown. Referring also to FIGS. 2 and 4, after power is applied to the control station 1 and metering device 8 (step 53), in step 55 the control station 1 transmits data including a preset amount to be dispensed by the metering device 8 through antenna 9 to antenna board 44 and the associated radio board 43 in the metering device 8. The received preset amount can be transmitted to the processor 29 which stores the dispensing data in memory. Once he data is received by the processor 29 the processor 29 signals the power transistors 47 to unlatch the latching solenoid 36 to remove the latching pin 38 from the locked closed position, wherein the valve is latched closed. The processor 29 then monitors the trigger sensing switch 27 to determine whether the lever 14 has been manually activated.

In step 59, when the control circuit 40 senses that the lever 14 has been activated and that the valve member assembly 24 is open, the processor 29 latches the latching solenoid 36 in the open position causing the pin 38 to extend into the recess 35, thereby latching the valve member 73 in the open position wherein the fluid can flow from the supply passage 22 through the valve member 73 to the supply passage 25 and therefore out the outlet 17. As fluid is dispensed, the processor 29 continually monitors the flow through the meter 10 as described above. The processor 29 also continually monitors the radio board 43 for transmissions from the control station 1, which can transmit a signal to the metering device to interrupt or halt the dispensing of fluid from the metering device 8.

When the batch is done, as shown in step 61, the preset amount has been dispensed. At this point, the processor 29 energizes the solenoid 36 through a release signal provided to the power transistor circuits 47, causing the pin 38 to retract. As the pin 38 retracts, the valve member assembly 24 moves to the manual position as described with reference to FIG. 3 above, aided by the spring 32. In the manual position, the valve can be temporarily activated by the lever 14 to allow a user to pump additional fluid, or "top off" the tank or container being filled (step 62). After the selected amount of fluid is dispensed, the user manually activates a reset switch, step 63, which is detected by the processor 29 and through the trigger sensing switch 27.

Referring now to step 65, after the reset signal is received, the metering device 8 provides a signal to the control station 1 through the radio board 43 and associated antenna 44. When the control station receives the reset signal it provides a disable signal to the control circuit 40 through the radio board 43 to disable the valve by energizing the solenoid 36, moving the latching pin 38 into the recess 39, and therefore locking the valve member assembly 24 in the closed position. The metering device 8 remains disabled until a new program is transmitted from the control station 1 (step 55), and the metering device 8 is then returned to the manual state, waiting for the lever 14 to again be manually activated.

Alternatively, to limit further dispensing after the preset amount has been dispensed, the solenoid 36 can latch the valve 24 in the closed position of FIG. 3*b* by again energizing the solenoid 36 to activate the latching pin 38. Here, the device is held in the closed position until the operator enters a reset 63 through the programming keys 20 or a dedicated key located on the user interface of the metering device 8. The reset provides an indication to the control station 1 that the metering device 8 is ready to receive a new preset amount, which is transmitted to the radio board 43 to begin the process again at step 55.

In operations the metering device 8 is controlled by the control circuit 40 and the control station 1 to dispense preset amounts or batches of lubricants. The control station 1 provides commands and data to the control circuit 40 which can include, for example, start commands, stop commands, interrupt commands, and data providing an amount of a lubricant to be dispensed. The metering device 8 receives commands and data from the control station 1, and controls the opening and closing of the valve member assembly 24, as well as metering functions, and manual operator signals.

This has been a description of the preferred embodiments of the method and apparatus of the present invention. Those of ordinary skill in this art will recognize that modifications might be made while still coming within the spirit and scope of the invention and, therefore, to define the embodiments of the invention, the following claims are made.

We claim:

1. A method of controlling a dispensing of an amount of lubricating liquid by a dispensing apparatus, the method comprising:

disabling actuation of a valve prior to receiving an enable signal;

responding to an enable signal from a control station located apart from the dispensing apparatus to enable actuation of the valve;

manually actuating a valve to move from a closed position to an open position;

energizing an electrically operable device for a first time to latch the valve in the open position;

measuring a parameter of the flow of the liquid; and in response to the parameter equaling a preset amount, energizing the electrically operable device for a second time to unlatch the valve and allow the valve to return to a closed position and stop the flow of liquid, generating a signal to the control station, said signal representing the batch preset amount has been dispensed; and receiving from the control station a signal to return to the disabling of the valve actuator from further operation until the next enable signal is received.

2. The method as defined in claim 1, wherein generating the signal to the control station that the batch preset amount has been dispensed comprises transmitting the signal to the control station through a wireless communications network; and receiving from the control station a signal to return to the blocking of the valve actuator from further operation until the next enable signal is received comprises receiving the signal from the control station through a wireless communications network.

3. The method as defined in claim 1, further comprising receiving the preset amount for dispensing from the control station.

4. The method as defined in claim 1, further comprising energizing the electrically operable device to latch the valve in a closed position.

5. The method as defined in claim 1, wherein a plurality of dispensing apparatuses are communicatively linked to the control station.

6. The method as defined in claim 2, wherein the wireless communication network is a radio frequency network.

7. The method as defined in claim 1, further comprising providing a resistive force opposing the manual lever when the valve is latched in the open position or in a closed position.

8. The method as defined in claim 1, further comprising:

receiving an override signal from the control station;

in response to the override signal, energizing the electrically operable device to latch the valve in the closed position.

9. The method as defined in claim 1, further comprising receiving from the control station a signal to start or stop metering of the amount of fluid dispensed.

10. The method as defined in claim 1, further comprising:

manually actuating a reset switch on the dispensing apparatus; and transmitting a reset signal to the control station, the reset signal providing an indication that the metering device is ready to dispense a second preset amount.

11. The method as defined in claim 1, further comprising selecting the preset value with a plurality of programming keys coupled to the dispensing apparatus.

12. A device for delivering a preset volume of liquid lubricant, the device comprising:

a valve including a valve member disposed to control liquid flow through a supply passage to an outlet;

an electrically operable latching mechanism for holding the valve member in an open position in which the supply passage is open to the flow of liquid and in a closed position in which the supply passage is closed to the flow of liquid;

a manually operable member for moving the valve member from a closed position to the open position;

a metering device operable to measure a parameter of flow of the liquid; and a control circuit for sensing the movement of the manually operable member and responsive thereto for energizing the electrically operable latching mechanism for holding the valve member in the open position; and wherein the control circuit is operably connected to the metering device to measure units of the flow parameter, and in response to the flow parameter equaling a preset amount, the control circuit causes energization of the latching mechanism to allow the valve member to return to a closed position; and further comprising radio frequency receiver and an antenna for receiving signals to enable and disable the operation of the manually operable member.

13. The device of claim 12, wherein, in response to a reset signal, the control circuit causes energization of the latching mechanism to latch the valve member in the closed position.

14. The device of claim 12, wherein the radio frequency receiver further receives signals providing the preset volume to dispense.

15. The device of claim 12, further comprising a latching pin moveably coupled to the electrically actuated solenoid, the latching pin for latching the valve in the open and the closed positions.

16. The device of claim 15, wherein the valve member comprises a start actuator moveably coupled to open the valve, the start actuator including first and second recesses, the first and second recesses being sized and dimensioned to receive the latching pin and positioned in the start actuator for latching the valve in the open and the closed positions, respectively.

17. The device of claim 16, wherein the start actuator further comprises a spring, the spring providing a manual feedback comprising a responsive force opposing the manually operable lever when the manually operable lever is activated and the latching pin is held in one of the first and second recesses.

18. The device of claim 12, further comprising a radio frequency transmitter, the radio frequency transmitter for transmitting a reset signal and the preset volume to a control station.

19. The device of claim 18, wherein the control station further comprises:

a user interface; and a radio frequency transmitter, wherein a batch program including a preset volume is entered at the user interface and is transmitted to the radio frequency receiver.

20. The device of claim 12, further comprising a manually-activated reset switch for providing a signal that the device is ready to dispense a second preset volume.

21. The device of claim 12, wherein the radio frequency receiver receives command data signals from the control station.

22. The device as defined in claim 12, wherein the radio frequency receiver further receives a signal selectively transmitted by the control station to interrupt the flow of fluid.

23. The device as defined in claim 16, wherein when the valve is latched in the closed position, the latching pin stops movement of the start actuator, thereby preventing fluid from leaking through the valve.

24. A device for delivering a preset volume of liquid lubricant, the device comprising:

a valve including a valve member disposed to control liquid flow through a supply passage to an outlet;

a metering device operable to measure a volume of flow of the liquid; and a control circuit responsive to a control signal for actuating the valve to an open position to commence delivery of the preset volume of liquid lubricant, wherein the control circuit, after dispensing the preset volume of liquid lubricant, de-actuates the valve to allow the valve to return to a closed position;

a casing for housing for valve, the metering device and the control circuit; and a radio frequency receiver and an antenna disposed in the casing for receiving the control signal to actuate and de-actuate the valve.

25. The device of claim 24, in combination with a master control station for transmitting the control signal and data representing a preset volume quantity to be dispensed.

26. The device of claim 24, wherein said casing has a head portion and handle portion, wherein said valve, said metering device and said control circuit are housed in said head portion and said radio frequency receiver and said antenna are housed in said handle portion.

27. The device of claim 24, wherein said casing has a head portion which is connected to a handle portion of the device, wherein said valve, said metering device and said control circuit are housed in said head portion and said radio frequency receiver and said antenna are housed in said handle portion.

28. The device of claim 24, said device further comprises a radio frequency transmitter for signaling to a master control station.

29. A wireless networked system for monitoring preset volumes of liquid lubricants dispensed through a plurality of handheld metering devices, the system comprising:

a master control station for receiving inputs representing preset volumes of liquid lubricants that are dispensed through a plurality of handheld metering devices;

a plurality of handheld metering devices for dispensing and measuring respective preset volumes of liquid lubricant; and wherein said handheld metering devices have radio frequency transmitter for communicating with the master control station; and wherein the master control station has a radio frequency receiver for receiving signals from the handheld metering devices to monitor the dispensing of the preset volumes of liquid lubricants.

30. The system of claim 29, wherein each of the handheld metering devices is connected through a hose to a supply of liquid lubricant.

31. The system of claim 29, wherein each of the handheld metering devices also has keys for entering a preset volume of liquid lubricant to be dispensed.

32. The system of claim 29, wherein said master control station also as a radio frequency transmitter for transmitting control data and preset volume data to the handheld metering devices, and wherein the handheld metering devices also have radio frequency receivers for receiving the control data and the preset volume data from the master control station.

33. The system of claim 32, wherein said control signals include star commands to start dispensing of an individual preset volume of liquid lubricant.

34. The system of claim 32 wherein said control data includes interrupt commands to interrupt dispensing of an individual preset volume of liquid lubricant.

* * * * *

UNITED STATES PATENT AND TRADEMARK OFFICE
CERTIFICATE OF CORRECTION

PATENT NO. : 6,659,306 B2
DATED : December 9, 2003
INVENTOR(S) : Boyle et al.

It is certified that error appears in the above-identified patent and that said Letters Patent is hereby corrected as shown below:

Column 6,
Line 39, "with present" should be -- with the present --.
Line 47, "Once he data" should be -- Once the data --.

Column 7,
Line 37, "operations" should be -- operation, --.

Column 10,
Line 41, "transmitter" should be -- transmitters --.
Line 54, "also as a" should be -- also has a --.

Signed and Sealed this

Twenty-eighth Day of June, 2005

JON W. DUDAS
*Director of the United States Patent and Trademark Office*